United States Patent
Decuir et al.

(10) Patent No.: US 9,319,828 B2
(45) Date of Patent: Apr. 19, 2016

(54) WIRELESS COMMUNICATION METHODS AND DEVICES

(71) Applicant: CSR Technology Inc., Sunnyvale, CA (US)

(72) Inventors: Joseph Decuir, Issaquah, WA (US); Raja Banerjea, San Jose, CA (US); Jeremy Stark, Cambridge (GB)

(73) Assignee: CSR Technology Inc., Sunnyvale, CA (US)

( * ) Notice: Subject to any disclaimer, the term of this patent is extended or adjusted under 35 U.S.C. 154(b) by 180 days.

(21) Appl. No.: 13/924,755

(22) Filed: Jun. 24, 2013

(65) Prior Publication Data

US 2014/0378058 A1    Dec. 25, 2014

(51) Int. Cl.
*H04B 7/00*  (2006.01)
*H04W 4/00*  (2009.01)

(52) U.S. Cl.
CPC ................................. *H04W 4/008* (2013.01)

(58) Field of Classification Search
CPC ..... H04W 84/18; H04W 88/06; H04W 76/02; H04M 1/7253; H04M 2250/02
USPC ................... 455/41.2, 418–420, 422.1, 550.1
See application file for complete search history.

(56) References Cited

U.S. PATENT DOCUMENTS

| | | | |
|---|---|---|---|
| 2009/0209202 A1* | 8/2009 | Martini ................ | H04W 12/02 455/41.2 |
| 2010/0008338 A1* | 1/2010 | Tsfati et al. .................. | 370/338 |
| 2012/0045994 A1* | 2/2012 | Koh et al. .................... | 455/41.3 |
| 2012/0052802 A1* | 3/2012 | Kasslin et al. .............. | 455/41.2 |
| 2013/0188538 A1* | 7/2013 | Kainulainen et al. ........ | 370/310 |
| 2014/0355517 A1* | 12/2014 | Reunamaki et al. ......... | 370/328 |

* cited by examiner

*Primary Examiner* — Nhan Le
(74) *Attorney, Agent, or Firm* — Mahamedi Paradice LLP

(57) ABSTRACT

Methods, devices and apparatus are disclosed, including a method of establishing a wireless connection with a device, the method including transmitting at least one Bluetooth advertising message on at least one Bluetooth channel, receiving a Bluetooth message indicating a connection request from the device, sending a Bluetooth message indicating at least one of a physical channel and an address to the device, and establishing the wireless connection with the device using the at least one of the address and the physical channel, wherein the wireless connection uses a different wireless technology to Bluetooth. Also disclosed is a method of establishing a wireless connection with a device, the method including receiving a Bluetooth advertising message from the device, sending a Bluetooth message indicating a connection request to the device, receiving a Bluetooth message indicating at least one of an address of the device and a physical channel, and establishing the wireless connection with the device using the at least one of the address and the physical channel, wherein the wireless connection uses a wireless technology different to Bluetooth.

32 Claims, 4 Drawing Sheets

WIRELESS COMMUNICATION METHODS AND DEVICES

TECHNICAL FIELD

Embodiments of the invention relate to at least one of device discovery, service discovery and quick connection, for example discovering devices with which a Wi-Fi Direct (WFD) connection or other wireless connection can be made, and finding them in frequency and/or address.

BACKGROUND

The Wi-Fi Alliance has specified a set of means to provide peer-to-peer wireless networking between two wireless devices called Wi-Fi Direct (also known as WFD or Wi-Fi P2P) using IEEE 802.11 radios. Examples of applications include access to other devices, sending files, playing files, displaying audio and/or video from one device to another, and printing documents. For example, one WFD-enabled wireless device may establish a WFD connection with a WFD-enabled printer and use the connection to wirelessly print documents.

Two devices may establish a Wi-Fi Direct connection if they have an IP connection or IP address. Once a WFD connection has been established, the connection can be used to exchange messages between the devices.

Wi-Fi Direct uses IEEE 802.11 radios. These radios in turn are currently defined in the 2.4GHz ISM band, the 5 GHz UNII band, and the 60 GHz band (WiGig). There is future work in progress that may allow 802.11 extensions to work in 800-900 MHz, in TV whitespace bands, and in 6-9 GHz bands.

SUMMARY OF EMBODIMENTS OF THE INVENTION

According to a first aspect, embodiments of the invention include a method of establishing a wireless connection with a device, the method comprising transmitting at least one Bluetooth advertising message on at least one Bluetooth channel, receiving a Bluetooth message indicating a connection request from the device, sending a Bluetooth message indicating at least one of a physical channel and an address to the device, and establishing the wireless connection with the device using the at least one of the address and the physical channel, wherein the wireless connection uses a different wireless technology to Bluetooth.

According to a second aspect, embodiments of the invention include a method of establishing a wireless connection with a device, the method comprising receiving a Bluetooth advertising message from the device, sending a Bluetooth message indicating a connection request to the device, receiving a Bluetooth message indicating at least one of an address of the device and a physical channel, and establishing the wireless connection with the device using the at least one of the address and the physical channel, wherein the wireless connection uses a wireless technology different to Bluetooth.

According to a third aspect, embodiments of the invention include a device adapted to establish a wireless connection with at least one other device, the device comprising transmitting apparatus adapted to transmit at least one Bluetooth advertising message on at least one Bluetooth channel, and receiving apparatus adapted to receive a Bluetooth message indicating a connection request from the other device, wherein the transmitting apparatus is adapted to transmit a Bluetooth message indicating at least one of an address and a physical channel to the other device, and wherein the device comprises apparatus adapted to establish a wireless connection with the other device using the at least one of the address and the physical channel, wherein the wireless connection uses a different wireless technology to Bluetooth.

According to a fourth aspect, embodiments of the invention include a device adapted to establish a wireless connection with at least one other device, the device comprising receiving apparatus adapted to receive a Bluetooth advertising message from the other device, and transmitting apparatus adapted to send a Bluetooth message indicating a connection request to the other device, wherein the receiving apparatus is adapted to receive a Bluetooth message indicating at least one of an address of the other device and a physical channel, and the device comprises apparatus adapted to establish the wireless connection with the other device using the at least one of the address and the physical channel, wherein the wireless connection uses a wireless technology different to Bluetooth.

BRIEF DESCRIPTION OF THE DRAWINGS

Embodiments of the invention will now be described with reference to the accompanying figures, in which.

DETAILED DESCRIPTION

Embodiments of the invention provide methods and apparatus for establishing a Wi-Fi Direct (WFD) connection or other type of wireless connection between at least two devices. For example, embodiments of the invention allow devices to discover each other, or at least one device to discover another device. "Discover" may mean to discover the presence of another device with suitable wireless communication capabilities (for example, the ability to communicate according to WFD) that is within a communicable range. Following discovery, the devices may communicate to establish a Wi-Fi Direct connection or other type of wireless connection. Embodiments of the invention may allow establishment of a wireless connection between devices that have no knowledge of each other's physical channel (e.g. 2.4 GHz ISM, 5 GHz UNII, 6-9 GHz or 60 GHz Ultra-Wideband or 800-900 MHz, and/or their address, such as internet protocol (IP) or media access control (MAC) address, and even where one or both devices do not have an IP address (e.g. IPv4 or IPv6 address).

Suitable devices that may connect to other devices by a Wi-Fi Direct connection or other type of wireless connection include, for example, cell phones, tablet computers, laptop computers, or any other computing or data processing device that can communicate with other devices, for example by exchanging data with other devices. Data exchanged with other devices may include audio, video, images, text, software and/or any other data. Often, devices (such as cell phones for example) include the ability to communicate according to multiple technologies.

For example, a device such as a cell phone may include the ability to communicate using Wi-Fi, Bluetooth, near-field communication (NFC), cellular technology (for example, 2G, 3G, 4G, LTE) and/or other communication technologies. The device may include one or more transmitters, one or more receivers and/or one or more antennas for communication using multiple technologies.

Embodiments described below refer to the specific example of establishing a Wi-Fi Direct connection between devices. However, other embodiments may establish other types of wireless connection. Embodiments of the invention use Bluetooth to discover one or more other devices and to exchange information to allow the device to connect with the other wireless technology. The information may comprise, for example, the address of one of the devices or information specifying the physical channel to be used by the wireless connection. The wireless connection uses technology different to Bluetooth (for example, Wi-Fi Direct).

Figure 1:
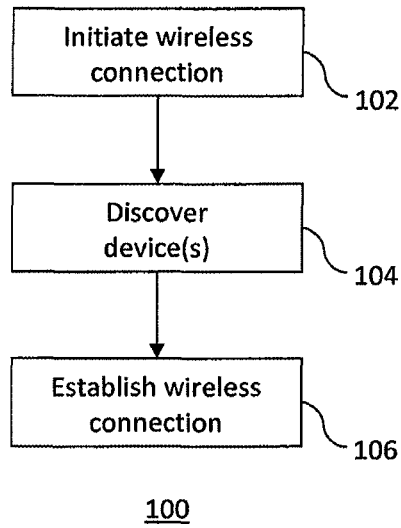
FIG. 1 shows an example of a method of establishing a Wi-Fi Direct connection according to embodiments of the invention.

FIG. 1 shows a first method 100, carried out by a device, of establishing a Wi-Fi Direct connection with one or more other devices according to some embodiments of the invention. In a first step 102, a Wi-Fi Direct connection process is initiated. This may be done in a number of ways. For example, a user of the device may activate a button, application or other control on the device. Alternatively, the device may be moved into proximity with another device (this may be detected using a suitable technology such as near field communication, NFC). In other examples, the device may constantly or periodically attempt to establish a Wi-Fi Direct connection with other devices without any input from the user or according to a predefined schedule.

Next, in step 104, the device discovers other devices within communicable range. In certain embodiments, this may include receiving an address and/or physical channel from another device or sending an address and/or physical channel to another device. The address may comprise, for example, the MAC address of the device or the other device. The physical channel may include, for example, information specifying the frequency of the physical channel to be used and/or any other information relating to the physical channel.

Finally, in step 106, a Wi-Fi Direct connection can be established between the device and the other device using the address and/or physical channel information exchanged in step 104. For example, a conventional Wi-Fi Direct connection process can be initiated by the device that is in possession of another device's address such as the MAC address, and/or may use the physical channel information provided. In this way, two devices can establish a Wi-Fi Direct connection without prior knowledge of each other's address or even without requiring either device to have an IP address. Additionally or alternatively, where physical channel information is exchanged, this may improve the WFD connection, for example by reducing the time required to set up the connection. For example, the devices may need to exchange a reduced amount of information to set up the connection. Additionally or alternatively, for example, the time for wireless searching by one or both devices to find each other (for example, searching one or more channels or frequencies) my be reduced or the need for searching may be eliminated.

Figure 2:
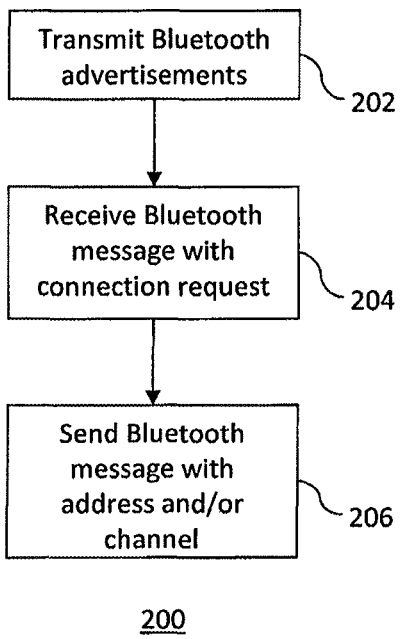
FIG. 2 shows an example of a method of discovering at least one device according to embodiments of the invention.

FIG. 2 shows an example of a process 200 for discovering devices. The process 200 may be a process of discovering devices according to step 104 of FIG. 1. In a first step 202 of the process 200 a device, which may be for example a "server" device, transmits one or more advertisement messages using Bluetooth technology. The advertisement messages advertise the presence of the device and indicate that the device is capable of using Wi-Fi Direct to communicate with other devices.

For example, the advertising messages may include a Universally Unique Identifier (UUID) that indicates availability of a Wi-Fi, Direct service within the device. The structure of a Bluetooth message (such as one or more Bluetooth packets) and the role of the UUID are defined further in Bluetooth specifications, such as "Core Specification of the Bluetooth System v3.0+High Speed" and "Core Specification of the Bluetooth System v4.0," both of which are incorporated herein by reference. The Bluetooth messages transmitted or received as described herein may comply with any suitable Bluetooth specification. A new UUID, for example "WFD Enable," may be defined to indicate the availability of a WFD service.

Following step 202, in step 204 a Bluetooth message is received from another device that indicates the desire of the other device to establish a Wi-Fi Direct communication. Next, in step 206, at least one Bluetooth message is sent to the other device that includes an indication of an address of the device that transmitted the advertisement messages in step 202, and/or the physical channel to be used by the subsequent wireless connection (e.g. Wi-Fi Direct connection). In some embodiments, the address is a MAC address.

Thus embodiments of the invention can use one wireless technology (e.g. Bluetooth) to advertise availability to use another, different wireless technology (e.g. Wi-Fi Direct) and exchange information (e.g. address, physical channel) to enable the other technology to be used, and/or to improve the connection such as reducing connection setup time.

Figure 3:
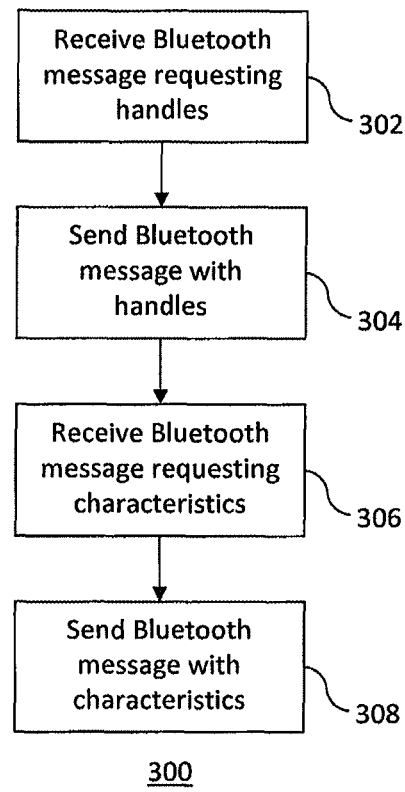
FIG. 3 shows an example of a method of sending an address and/or information on a physical channel according to embodiments of the invention.

In some embodiments, the process 104 for discovering other devices involves a two-stage process: Bluetooth device discovery, and Bluetooth service discovery. In some embodiments, the steps 202 and 204 in FIG. 2 are those carried out during Bluetooth device discovery, and the step 206 is carried out during or consists of Bluetooth service discovery (such as, for example, Service Discovery Protocol, SDP) and includes multiple Bluetooth messages. FIG. 3 shows an example of a process 300 for discovering services, which may be a process of sending an address and/or information on a physical channel according to step 206 of FIG. 2, and may be carried out by a "server" device. In step 302 of the process 300, the server device receives a Bluetooth message from another device requesting handles of the Wi-Fi Direct service. The message may include a UUID corresponding to the Wi-Fi Direct service, and may be the same UUID as that included in the message transmitted in the advertisement messages in step 202 of FIG. 2. In response, the device in step 304 transmits a Bluetooth message to the other device indicating handles of the Wi-Fi Direct service, for example a starting handle and an ending handle.

Some Bluetooth specifications, such as Bluetooth 4.0 for example, define a logical structure for Bluetooth Low Energy data structures. The data structures include an Attribute Protocol (ATT) and a Generic Attribute Profile (GATT). Handles are 16-bit values that that point to each attribute in the data structure. The handles may, for example, be defined by the designer of the data structure, specified by the standard, dynamically generated or produced in any other suitable manner. An attribute in turn has a type (consisting of a 16-bit or 16-octet value), indicating the type of data represented by that attribute, and a value. The data structure may be stored by a Bluetooth "server" device and may be at least partially copied to a Bluetooth "client" device when the devices connect. In one embodiment, an example of a portion of the data structure, from the starting handle to the ending handle, is illustrated in the following table:

| Handle | Type | Value | Size |
| --- | --- | --- | --- |
| Starting handle | <PHY Channel> | From 802.11 Standard | Pad to UINT48 |
| | <MAC Address> | Server MAC address | UINT48 |
| | <WFD Service> | Hash of WFD Send | UINT48 |
| | <WFD Service> | Hash of WFD Play | UINT48 |
| | <WFD Service> | Hash of WFD Display | UINT48 |
| Ending handle | <WFD Service> | Hash of WFD Printing | UINT48 |

Thus the data structure defines a physical channel (PHY channel) to be used for the subsequent wireless connection, and is taken from the channels specified by the 802.11 standard. The data structure also includes a MAC address of the server device, and four WFD Service attributes defining various aspects of the Wi-Fi Direct service. In one implementation, each attribute has a 48-bit value, padded (e.g. with additional zeros) if appropriate, though in other implementations the attributes may have values represented by other numbers of bits. The four attribute values WFD Send, WFD Play, WFD Display and WFD Printing are defined by the Wi-Fi Direct standard, and may indicate for example that the Wi-Fi Direct service may be available for sending a file or data, playing music, displaying video and printing a document respectively, for example. Other implementations may specify different features or more or fewer features of the available Wi-Fi Direct service. Additionally or alternatively, some devices may not support all services. For example, if a device only supports one service, such as playing music, the data structure may specify only the PHY Channel, MAC Address and WFD Service =hash of WFD Play, for example. The hash of a WFD Service is a hash function of a value that identifies the Wi-Fi Direct service. The values that identify Wi-Fi Direct services may be predefined, for example defined in the Wi-Fi Direct standard.

Additionally or alternatively, in embodiments where only one of the physical channel information or the MAC address is exchanged, the other attribute (for example PHY Channel where only the address is exchanged) can be omitted.

Referring back to FIG. 3, in step 306, a Bluetooth message is received from the other device requesting characteristics of a service, and specified the handles transmitted in step 304. In response, in step 308 the device transmits to the other device a Bluetooth message specifying characteristics of the Wi-Fi Direct service. The characteristics include at least an address, such as a MAC address for example, of the server device, and/or details of the physical channel to be used by the subsequent wireless connection.

In some embodiments, Bluetooth device discovery is performed according to Bluetooth Low Energy Advertising, and Bluetooth service discovery is performed according to the Generic Attribute Protocol (GATT), both of which are defined in "Core Specification of the Bluetooth System v4.0."

Figure 4:
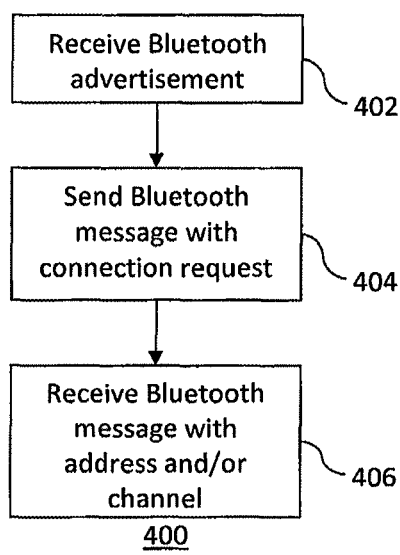
FIG. 4 shows another example of a method of discovering at least one device according to embodiments of the invention.

The process 100 of establishing a Wi-Fi Direct connection shown in FIG. 1 can be performed by a "server" device, as described above, or alternatively by a "client" device. FIG. 4 shows an example of a process 400 for discovering devices performed by, for example, a "client" device. In step 402, a Bluetooth advertisement message is received, for example from a "server" device. The client device listens for Bluetooth advertisement messages, for example constantly, periodically or according to a predefined schedule. The Bluetooth advertisement may include a UUID specifying availability of a Wi-Fi Direct service at the source of the advertisement. In step 404, the client device responds with a Bluetooth message indicating a request to connect to the source (e.g. server) device with a Wi-Fi Direct connection. In step 406, a Bluetooth message is received with an address of the source device and/or details of the physical channel to be used. The client device may then establish a Wi-Fi Direct connection with the source device using the address, which may be a MAC address for example, and/or the specified physical channel.

Figure 5:
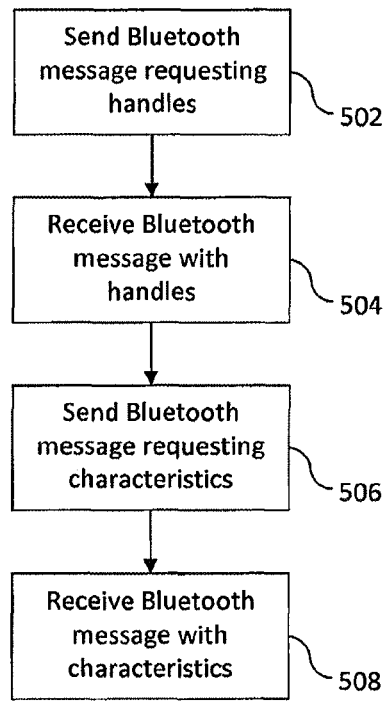
FIG. 5 shows an example of a method of receiving an address and/or information on a physical channel according to embodiments of the invention.

One example of the step 406 of receiving the address and/or information on the physical channel is shown in FIG. 5. FIG. 5 shows a process 500 wherein in a first step 502 the device, for example the "client" device, sends a Bluetooth message to the source device (for example, server device) requesting handles of a Wi-Fi Direct service. The message may, for example, include a UUID that specifies a Wi-Fi Direct service. Next, in step 504, a Bluetooth message is received, for example from the server device, indicating handles (such as starting handle and ending handle) of the Wi-Fi Direct service. In response, the client device in step 506 sends a Bluetooth message to the server device requesting characteristics of the service specified by the handles, i.e. the Wi-Fi Direct service. In step 508, a Bluetooth message is received, for example from the server device, indicating characteristics of the Wi-Fi Direct service. The characteristics include at least an address, such as a MAC address, of the server device, and/or information on a physical channel.

It has been demonstrated above that two devices, such as a "server" device and a "client" device, can establish a Wi-Fi Direct connection or other type of wireless connection without the need for an IP address by using Bluetooth protocols and messages, and/or with an improved (such as faster) connection setup time. Each Bluetooth message may comprise one or more Bluetooth packets.

Figure 6:
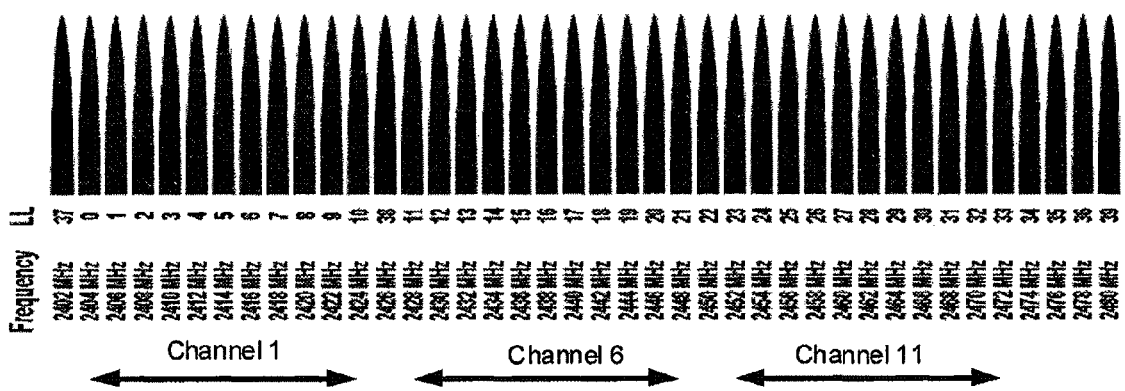
FIG. 6 shows frequency bands used by Bluetooth Low Energy.

In some embodiments Bluetooth advertisement messages are received, and a device listens for such messages, on a limited number of Bluetooth channels. FIG. 6 shows the 40 Bluetooth channels used by Bluetooth Low Energy, including the channel number and channel frequency. In some embodiments of the invention, advertisement messages are transmitted on one or more of channels 37, 38 and 39. These channels are selected because they do not overlap with commonly used Wi-Fi channels 1, 6 and 11, the ranges of which are shown in FIG. 6 as "Channel 1," "Channel 6" and "Channel 11."

Figure 7:
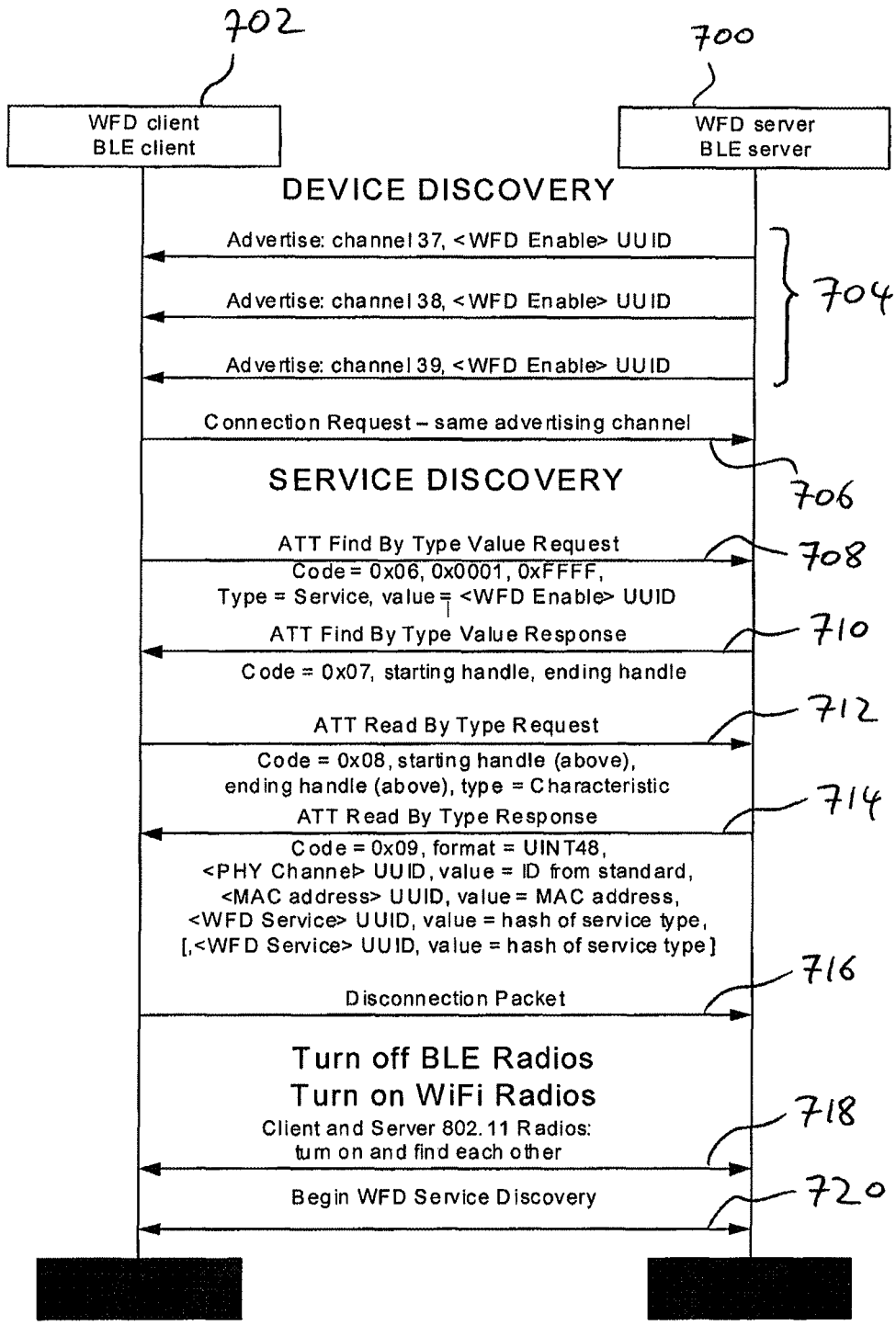
FIG. 7 shows communications between devices according to embodiments of the invention.

FIG. 7 shows an example of communication between a server device 700 and a client device 702 to establish a Wi-Fi Direct connection according to embodiments of the invention. The server device first transmits Bluetooth advertisement messages on Bluetooth Low Energy channels 37, 38 and 39 that include a UUID having a value corresponding to "WFD Enable," i.e. that the server device 700 is capable of communicating by Wi-Fi Direct. This may be an example of step 202 of FIG. 2. The client device 702 subsequently transmits a Bluetooth connection request message 706 to the server device 700, for example on the same channel on which an advertisement message was received. This completes Bluetooth Low Energy device discovery.

Next, service discovery is implemented, and the client device 702 transmits a Bluetooth Attribute Protocol (ATT) Find By Type Value Request message 708 to the server device 700, with code 0x06, starting handle 0x0001, ending handle 0xFFFF, type=service (i.e. the type has a value specifying a service type), and UUID specifying "WFD Enable". This may be an example of step 502 of FIG. 5.

The server device 700 responds with an ATT Find By Type Value Response message 710 to the client device 702, with code 0x07, and starting handle and ending handle of the WFD service. This may be an example of step 304 of FIG. 3. The client device 702 subsequently sends an ATT Read By Type Request message 712 to the server device 700 with code 0x08, the starting handle and ending handle received in message 710, and type=characteristic. This may be an example of step 506 of FIG. 5. The server device 700 responds with an ATT Read By Type Response message 714 with code 0x09, format UINT48, UUID value specifying "PHY Channel" and value=information identifying a physical channel from the 802.11 standard. The message 714 also includes UUID value specifying "MAC Address" and a value being the MAC address of the server device 700. This may be an example of step 308 of FIG. 3.

The client device 702 then sends a Bluetooth disconnection packet 716 to the server device 700 to disconnect any Bluetooth connection between the devices 700 and 702 that may be persistent following the exchange of Bluetooth messages shown in FIG. 7.

Following message 716, use of Bluetooth for device and service discovery is complete. Therefore, if Bluetooth technology is not required for other communications, any Bluetooth components or apparatus (for example, any transmitters, receivers, amplifiers, digital signal processors and/or other components) may be switched off to save power. At the same time, if Wi-Fi components or apparatus (for example, any transmitters, receivers, amplifiers, digital signal processors and/or other components) have been switched off to save power, they can be switched on. Subsequently, Wi-Fi communications can be exchanged between the devices 700 and 702 to find each other, and a conventional Wi-Fi Service Discovery process 720 can commence. This may, for example, include using Universal Plug and Play (UPnP). Alternatively, a different type of wireless connection can be set up between the devices.

The above description of embodiments refer to Bluetooth messages. A Bluetooth message may comprise a Bluetooth packet or multiple Bluetooth packets.

The use of Bluetooth is advantageous in embodiments of the invention as Bluetooth uses similar frequencies to Wi-Fi (for example, the 2.4 GHz ISM band), but that usually don't exactly overlap, as shown in FIG. 6. This may allow certain implementations to, for example, share some components such as an antenna between Wi-Fi apparatus and Bluetooth apparatus. Additionally or alternatively Bluetooth, particularly Bluetooth Low Energy, is designed to have low power consumption and low latency, thus allowing a fast and efficient way for establishing a wireless connection that uses a different wireless technology to Bluetooth according to embodiments of the invention.

What is claimed is:

1. A method of establishing a wireless connection with a device, the method comprising:
   transmitting at least one Bluetooth advertising message on at least one Bluetooth channel;
   receiving a Bluetooth message indicating a connection request from the device;
   sending a Bluetooth message indicating at least one of a physical channel and an address to the device;
   receiving a Bluetooth message indicating a request for handles of a wireless service from the device;
   sending a Bluetooth message indicating the handles of the wireless service to the device;
   receiving a Bluetooth message indicating a request for characteristics of the wireless service specified by the handles from the device;
   sending, in response to the request for characteristics, a Bluetooth message indicating characteristics of the wireless service including the at least one of the address and the physical channel; and
   establishing the wireless connection with the device using the at least one of the address and the physical channel indicated in the Bluetooth message sent to the device, wherein the wireless connection uses a different wireless technology than Bluetooth.

2. The method of claim 1, wherein the Bluetooth message sent to the device uses the Bluetooth Generic Attribute Protocol (GATT).

3. The method of claim 1, wherein the Bluetooth message is sent to the device in response to receiving a Bluetooth message indicating a request for service characteristics from the device.

4. The method of claim 1, further comprising disconnecting a Bluetooth connection with the device when the at least one of the address and the physical channel has been sent to the device.

5. The method of claim 4, further comprising turning off at least one of a Bluetooth transmitter and a Bluetooth receiver when the Bluetooth connection is disconnected.

6. The method of claim 1, wherein the at least one of the address and the physical channel comprises a media access control (MAC) address.

7. The method of claim 1, further comprising transmitting Bluetooth advertising messages on at least one of Bluetooth channels 37, 38 and 39.

8. The method of claim 1, wherein the wireless connection comprises a Wi-Fi Direct connection.

9. A method of establishing a wireless connection with a device, the method comprising:
   receiving a Bluetooth advertising message from the device;
   sending a Bluetooth message indicating a connection request to the device;
   sending a Bluetooth message indicating a request for handles of a wireless service to the device;
   receiving a Bluetooth message indicating the handles of the wireless service from the device:
   sending a Bluetooth message indicating a request for characteristics of the wireless service specified by the handles to the device;
   receiving, in response to the request for characteristics, a Bluetooth message indicating characteristics of the wireless service including at least one of an address of the device and a physical channel; and
   establishing the wireless connection with the device using the at least one of the address and the physical channel indicated in the Bluetooth message received from the device, wherein the wireless connection uses a wireless technology different than Bluetooth.

10. The method of claim 9, wherein the Bluetooth message received from the device uses the Bluetooth Generic Attribute Protocol (GATT).

11. The method of claim 9, wherein the Bluetooth message indicating the at least one of the address of the device and the physical channel is received in response to sending a Bluetooth message indicating a request for service characteristics to the device.

12. The method of claim 9, further comprising disconnecting a Bluetooth connection with the device when the at least one of the address and the physical channel has been received from the device.

13. The method of claim 12, further comprising turning off at least one of a Bluetooth transmitter and a Bluetooth receiver when the Bluetooth connection is disconnected.

14. The method of claim 9, wherein the at least one of the address and the physical channel comprises a media access control (MAC) address.

15. The method of claim 9, further comprising listening for at least one Bluetooth advertising message on at least one Bluetooth channel.

16. The method of claim 15, wherein listening for at least one Bluetooth advertising message comprises listening on at least one of Bluetooth channels 37, 38 and 39.

17. A device configured to establish a wireless connection with at least one other device, the device comprising:
 a transmitting apparatus configured to transmit at least one Bluetooth advertising message on at least one Bluetooth channel; and
 a receiving apparatus configured to:
  receive a Bluetooth message indicating a connection request from the other device;
  receive a Bluetooth message indicating a request for handles of a wireless service from the other device; and
  receive a Bluetooth message indicating a request for characteristics of the wireless service specified by the handles from the other device;
 wherein the transmitting apparatus is configured to:
  transmit a Bluetooth message indicating the handles of the wireless service to the other device; and
  transmit, in response to the request for characteristics, a Bluetooth message indicating at least one of an address and a physical channel to the other device; and
 wherein the device comprises an apparatus configured to establish a wireless connection with the other device using the at least one of the address and the physical channel indicated in the Bluetooth message transmitted to the other device, wherein the wireless connection uses a different wireless technology than Bluetooth.

18. The device of claim 17, wherein the transmitting apparatus is configured to transmit the at least one of the address and the physical channel to the other device using the Bluetooth Generic Attribute Protocol (GATT).

19. The device of claim 17, wherein the receiving apparatus is configured to receive a Bluetooth message indicating a request for service characteristics to the other device, and the transmitting apparatus is configured to transmit the Bluetooth message indicating the at least one of the address and the physical channel to the other device by transmitting a Bluetooth message indicating characteristics of a wireless service including the at least one of the address and the physical channel.

20. The device of claim 17, the device further configured to disconnect a Bluetooth connection with the other device when the at least one of the address and the physical channel has been sent to the other device.

21. The device of claim 20, the device further configured to turn off at least one of a Bluetooth transmitter and a Bluetooth receiver when the Bluetooth connection is disconnected.

22. The device of claim 17, wherein the at least one of the address and the physical channel comprises a media access control (MAC) address.

23. The device of claim 17, wherein the transmitting apparatus is configured to transmit Bluetooth advertising messages on at least one of Bluetooth channels 37, 38 and 39.

24. The device of claim 17, wherein the wireless connection comprises a Wi-Fi Direct connection.

25. A device configured to establish a wireless connection with at least one other device, the device comprising:
 a receiving apparatus configured to receive a Bluetooth advertising message from the other device; and
 a transmitting apparatus configured to:
  send a Bluetooth message indicating a connection request to the other device;
  send a Bluetooth message indicating a request for handles of a wireless service to the other device; and
  send a Bluetooth message indicating a request for characteristics of the wireless service specified by the handles to the other device;
 wherein the receiving apparatus is configured to:
  receive a Bluetooth message indicating the handles of the wireless service; and
  receive, in response to the request for characteristics, a Bluetooth message indicating at least one of an address of the other device and a physical channel; and
 the device comprises an apparatus configured to establish the wireless connection with the other device using the at least one of the address and the physical channel indicated in the Bluetooth message received from the other device, wherein the wireless connection uses a wireless technology different than Bluetooth.

26. The device of claim 25, wherein the receiving apparatus is configured to receive the at least one of the address and the physical channel from the other device using the Bluetooth Generic Attribute Protocol (GATT).

27. The device of claim 25, wherein the transmitting apparatus is configured to send a Bluetooth message indicating a request for service characteristics to the other device, and the receiving apparatus is configured to receive the at least one of the address of the other device and the physical channel by receiving in response from the other device a Bluetooth message indicating characteristics of a wireless service including the at least one of the address of the other device and the physical channel.

28. The device of claim 25, the device further configured to disconnect a Bluetooth connection with the other device when the at least one of the address and the physical channel has been received from the other device.

29. The device of claim 28, the device further configured to turn off at least one of a Bluetooth transmitter and a Bluetooth receiver when the Bluetooth connection is disconnected.

30. The device of claim 25, wherein the at least one of the address and the physical channel comprises a media access control (MAC) address.

31. The device of claim 25, wherein the receiving apparatus is configured to listen for at least one Bluetooth advertising message on at least one Bluetooth channel.

32. The device of claim 31, wherein said at least one Bluetooth channel comprises at least one of Bluetooth channels 37, 38 and 39.

* * * * *